March 23, 1965 H. OESTRICH ET AL 3,174,411
FLOORINGS FOR TAKING-OFF AND LANDING
Filed April 18, 1961 5 Sheets-Sheet 1
Fig.:1
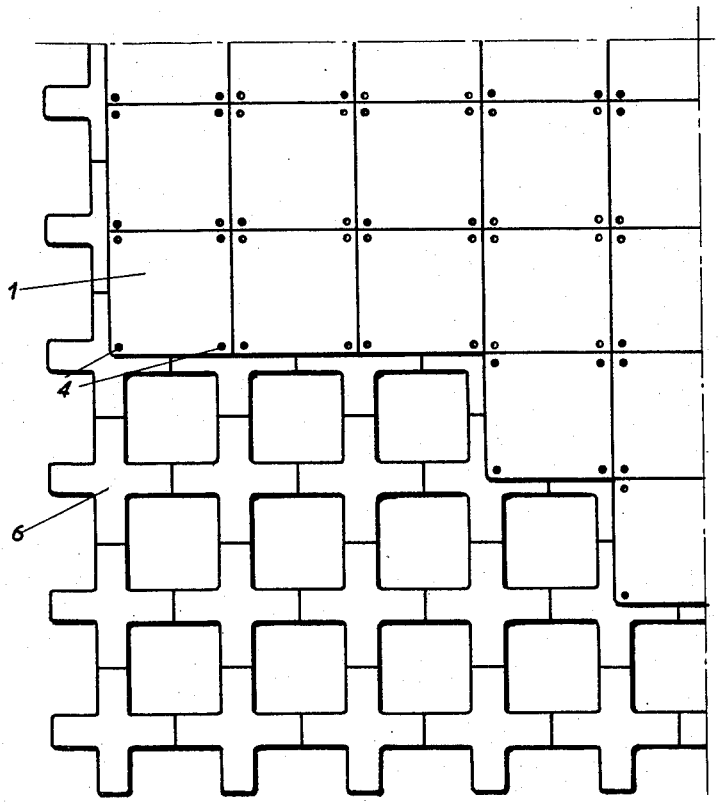
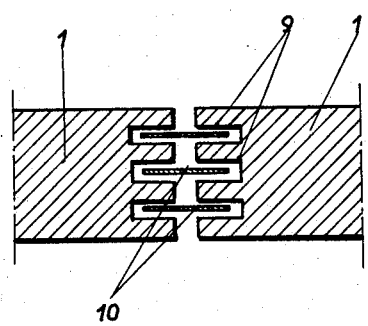
Fig.:3
INVENTORS
H. Oestrich
L. Michard
A. D. Meunier
J. M. Minor
Watson, Cole, Grindle + Watson
ATTORNEYS

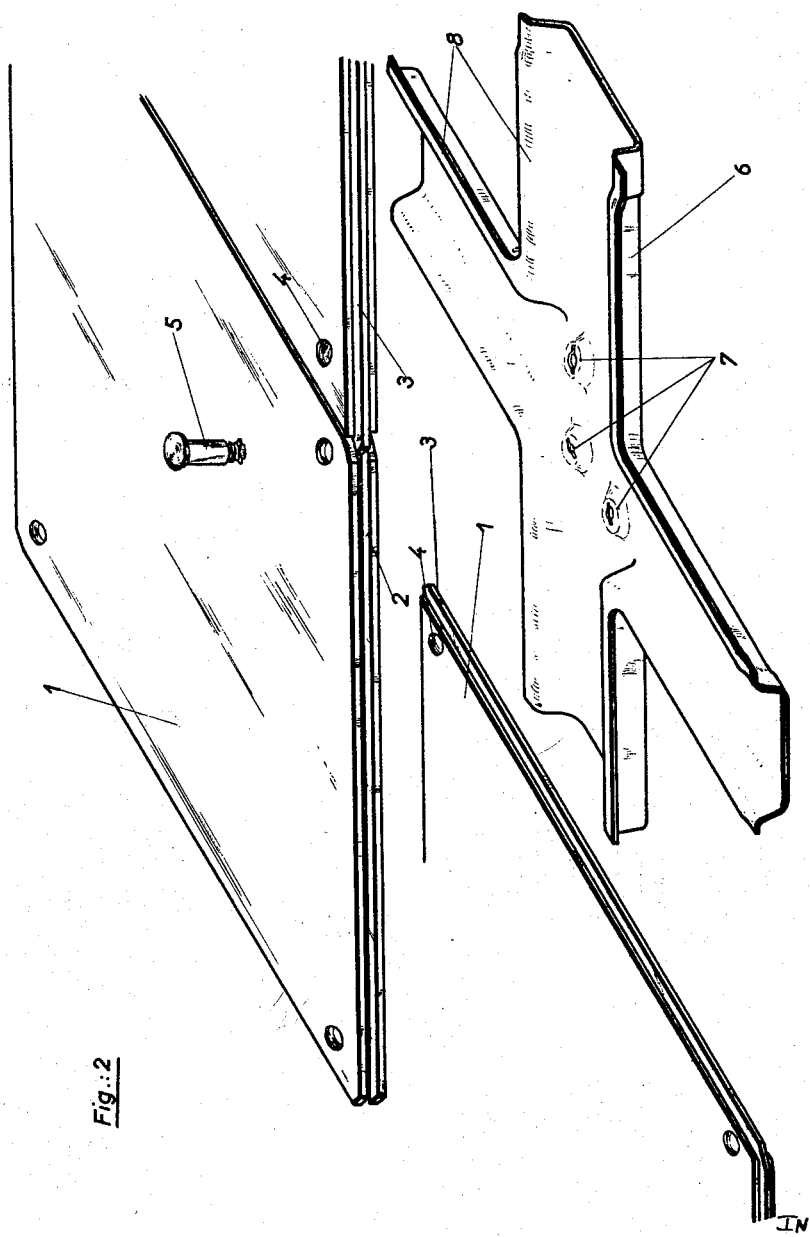

March 23, 1965  H. OESTRICH ET AL  3,174,411
FLOORINGS FOR TAKING-OFF AND LANDING
Filed April 18, 1961  5 Sheets-Sheet 3
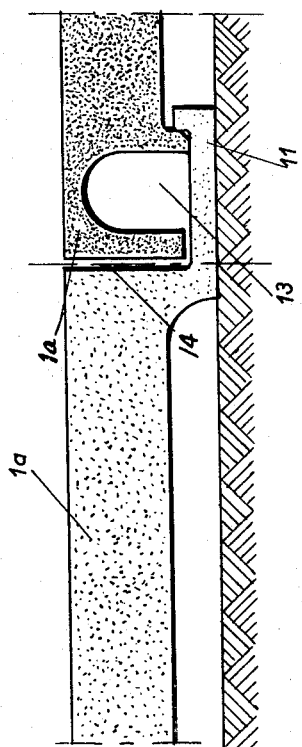
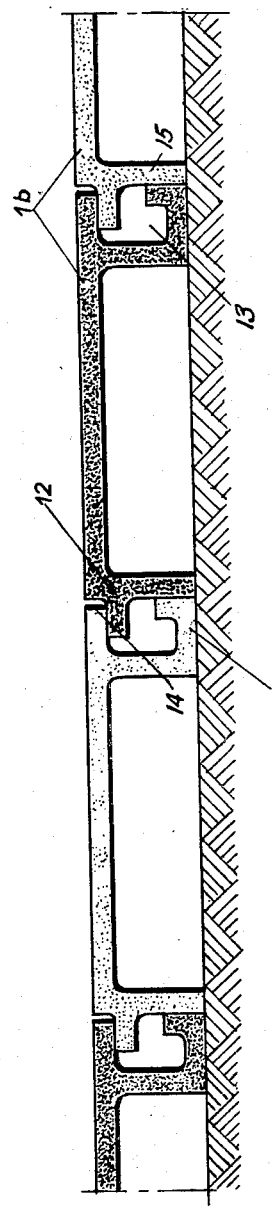
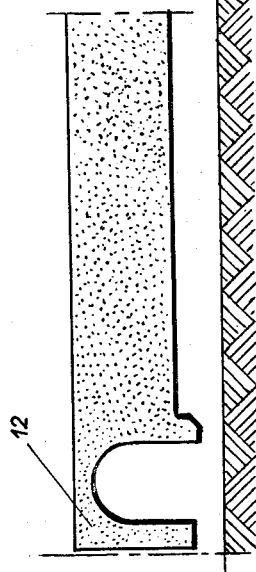
INVENTORS
H. Oestrich
L. Michard
A. L. Meunier
J. M. Minor
Watson, Cole, Grindle & Watson
ATTORNEYS

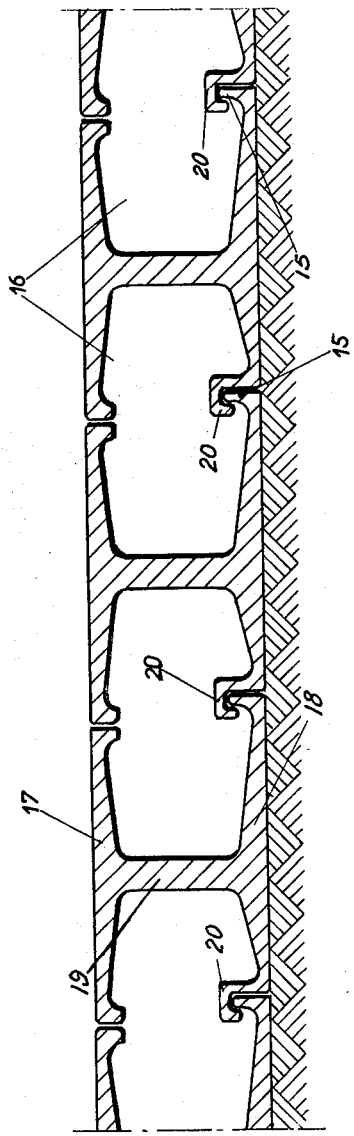

March 23, 1965 H. OESTRICH ET AL 3,174,411
FLOORINGS FOR TAKING-OFF AND LANDING
Filed April 18, 1961 5 Sheets-Sheet 5
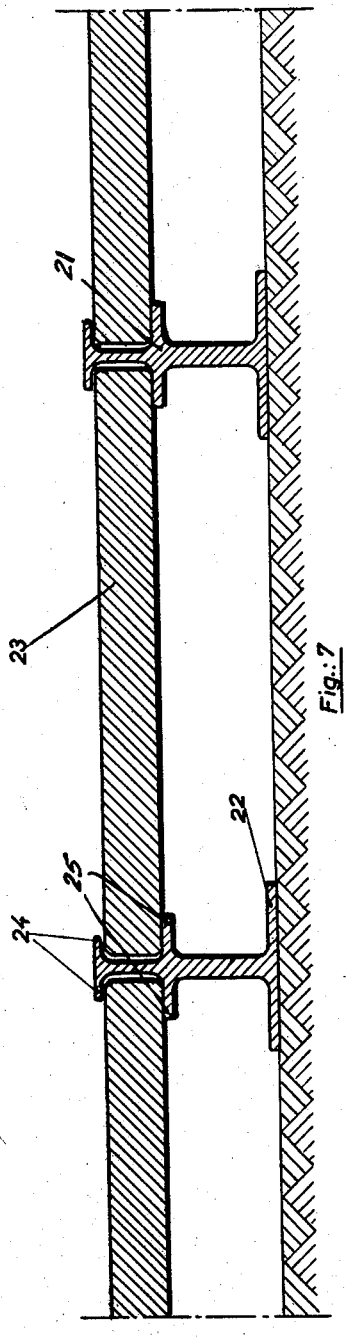
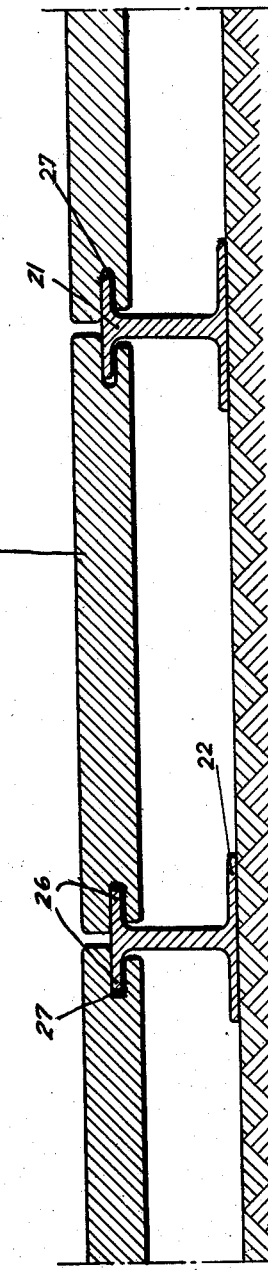
INVENTORS
H. Oestrich
L. Michard
A. S. Meunier
J. L. Minor
Watson, Cole, Grindle & Watson
ATTORNEYS

United States Patent Office 3,174,411
Patented Mar. 23, 1965

3,174,411
FLOORINGS FOR TAKING-OFF AND LANDING
Hermann Oestrich, Paris, Louis Michard, Fontenay-aux-Roses, Auguste Laurent Meunier, L'Hay-les-Roses, and Jean-Marie Minos, Paris, France, assignors to Societe Nationale d'Etude et de Construction de Moteurs d'Aviation, Paris, France, a company of France
Filed Apr. 18, 1961, Ser. No. 103,760
Claims priority, application France, Apr. 25, 1960, 825,235
2 Claims. (Cl. 94—4)

It has already been proposed to construct take-off floorings by laying down flooring slabs or other prefabricated elements.

The present invention relates to floorings of this kind, more particularly those which are intended for aircraft which take-off and land vertically, and which for this reason have the advantage of being of small dimensions.

For reasons of a technical and military order, these floorings should satisfy the following essential conditions:

(1) It should be possible to lay and take-up the flooring rapidly with non-specialist labour.

(2) The materials, their form and their method of assembly should be selected so that the parts are light, of relatively small bulk and sufficiently robust so that they do not suffer excessive damage by repeated assembly and dismantling.

(3) The completed flooring should be capable of adapting itself to roughly-levelled ground and should withstand slight settlements of the ground covered, if so required.

(4) Since the pressure of the vertical-lift jet on the surface of the ground can give rise to the projection of the materials constituting this ground, which is liable to result in damage to the cell and even to the engine if the air-intake of this latter is not out of reach or protected, it is necessary to provide adequate sealing of the joints against the jet gases or at least to prevent the gases which have passed through the joints from coming into contact with the ground.

(5) The flooring should be able to withstand the high temperatures of the lifting jets and the weight of the aircraft, and it is therefore essential that the materials selected should withstand heat and that the joints permit free expansion of the whole flooring, without deformation.

The present invention has for its object a take-off flooring complying with the conditions which have been enumerated above, and comprising the combination of a flooring of metallic or like plates with means specially designed to collect the leakage of gas at the level of the joints between the plates, and to channel them towards the periphery of the flooring where they are evacuated. The arrangement of the said means preferably constitutes at the same time the support of the flooring proper on the ground, which is equivalent to stating that this flooring is supported by the whole of the evacuation channels of the leakage gases collected from these joints.

In accordance with one form of embodiment of the present invention, the supports in question are metallic elements having the appearance of cross-shaped bowls, the dimensions of which, measured between the extremities, are equal to or of the same order as the dimensions of the flooring plates, these elements being intended to be placed end to end on the ground so as to form a kind of lattice on which the plates are fixed, in such manner that the sides of the plates are substantially vertically above the axes of the cross-shaped bowls, while their corners are located at the intersection of the arms of these latter.

In accordance with an alternative form of embodiment, the plates of the flooring have a shape designed so as to constitute, at the juxtaposition of the plates, sections of conduit passing along the joints and resting on the ground.

In accordance with a further alternative form of construction, the plates are supported at a short distance from the ground by suitable metallic sections.

The description which follows below with reference to the accompanying drawings (which are given by way of example only and not in any limitative sense) will make it quite clear how the invention may be carried into effect, the special features which are brought out, either in the text or in the drawings, being understood to form a part of the said invention.

FIG. 1 is a partial diagrammatic plan view of a flooring constructed according to the present invention, in course of being laid.

FIG. 2 is a persepective view to a larger scale, showing the method of assembly.

FIG. 3 is a vertical cross-section of an alternative form of gas-tight joint.

FIGS. 4 to 8 are partial vertical cross-sections of five further forms of embodiment of the invention.

In the example illustrated in FIGS. 1 and 2, the flooring plates 1 are of square form, for example, and are made of a cast aluminium alloy. They are assembled together so as to cover all the necessary surface and are fitted to each other by peripheral grooves 2, in which are engaged tongues 3 formed on the periphery of the plates 1.

At the four corners of each plate are formed holes 4 for the passage of fixing devices 5 with flat or slightly-domed heads.

The flooring plates are supported above the ground by cross-shaped members 6 of dished form, the dimension of which, measured between the extremities, are equal to the sides of the square plates, these members being arranged end to end to form a lattice shown at the lower left-hand side of FIG. 1. At the intersection of the arms of each cross-shaped member 6 are formed perforations 7 at the angles of a square identical with that determined by the adjoining holes 4 of four juxtaposed adjacent plates, in such manner that these holes 4 come vertically above the perforations 7. The latter perforations are intended to receive the extremities of the fixing devices 5 and to ensure interlocking.

The cross-shaped members 6 have their upper edges 8 bent back into the same plane and serve as seatings for the flooring plates 1.

The flooring plates thus de-limit, with the lattice of dished elements 6, a network of conduits located below the joints between the flooring plates and opening into the periphery of the flooring thus constructed. The gases which can pass through the joints in spite of the obstacles formed by the engagement of the tongues or ribs 3 in the grooves 2 are thus collected in this network and channelled towards the periphery from which they are evacuated.

It is furthermore possible to perfect the gas-tightness at the joints by making use of the alternative shown in FIG. 3. The flooring plates 1 are provided in this case on their edges with a number of thin deep parallel grooves situated exactly opposite similar grooves formed in the adjacent plates. Thin strips 10 are engaged in these grooves, the assembly thus constituting a labyrinth joint.

In the forms of embodiment of FIGS. 4 and 5, the flooring plates 1a, 1b are laid directly on the ground by their sole plates 11 (and where applicable by their flanges 15) which also form, with the peripheral specially-shaped portions 12 of the adjoining plates, channels 13 which permit the retention of the gases having passed through the joints 14 and these gases are evacuated at the periphery of the flooring, as in the previous case.

In the form of embodiment shown in FIG. 6, the flooring plates comprise two sole-plates 17 and 18 joined together by a central web 19 at two opposite parallel sides. The lower sole-plate 18 of each flooring plate terminates at one extremity in a straight edge 15 and at the other extremity by a folded-back edge 20 designed so as to cover the straight edge 15 of the adjacent lower sole-plate, so as to ensure a certain gas-tightness and to prevent the leakages of gas at this level.

The juxtaposed flooring plates form evacuation channels 16 having a particularly large section and a very simple outline. In the example shown in the drawing, these channels are substantially rectangular.

In the alternatives shown in FIGS. 7 and 8, use has been made of metallic girder sections 21 having lengths equal to one of the dimensions of the flooring to be laid. These sections are laid on the ground parallel to each other by their sole-plates 22. The flooring plates 23 are mounted at a short distance from the ground, either by sliding them one after the other into one extremity of the sections 21, into housings formed by two flanges 24 and 25 on each side of the sections (FIG. 7), or on the other hand, as shown in FIG. 8, by engaging the flanges 26 of the section in grooves 27 formed in the two oppositely-facing edges of the flooring plates.

It will of course be understood that modifications may be made to the forms of embodiment which have been described above, in particular by the substitution of equivalent technical means, without thereby departing from the scope of the present invention.

In particular, it is quite clear that the fixing devices 5 which engage in the perforations 7 can be replaced by screws engaging in nuts rigidly fixed to the cross-shaped elements 6. In the same way, it is possible to use flooring plates having a shape other than square, for example rectangular or even strips of great length, especially in the form of embodiment shown in FIG. 5.

What is claimed is:
1. A take-off and landing structure designed for vertical take-off and landing jet aircraft, comprising a multiplicity of metal plates having a flat upper surface, said plates being jointed side by side in juxtaposed coextensive relation and forming a horizontal flooring which is smooth and planar throughout and substantially free of upwardly projecting protrusions, cruciform gutter-shaped members in mutual registering end-wise abutment, forming a crossed-network lattice adapted to rest on the soil said members extending underneath the flat upper surfaces of said plates and along the jointed sides of adjacent plates right to the periphery of said flooring, said lattice of cruciform gutter-shaped members supporting said flooring and being detachably connected thereto by removable securing means which lock said plates in position, whereby any gas leaking downwardly between said jointed sides will be led off to the periphery of said flooring.

2. A structure as claimed in claim 1, wherein the plates are of rectangular shape and the sides thereof extend substantially in the planes of symmetry of the cruciform members, the corners of said plates lying substantially at the intersection of said planes of symmetry.

References Cited by the Examiner
UNITED STATES PATENTS

| | | | |
|---|---|---|---|
| 209,310 | 10/78 | Wands | 50—202 |
| 748,746 | 1/04 | Kelsey | 20—8 |
| 1,987,490 | 1/35 | Mulford | 94—27 |
| 2,116,033 | 5/38 | Malone | 94—4 |
| 2,310,426 | 2/43 | Greulich | 94—4 |
| 2,355,834 | 8/44 | Webb | 20—8 |
| 2,877,877 | 3/59 | Davis | 50—202 |
| 3,087,693 | 4/63 | Nicholson | 244—114 |

FOREIGN PATENTS

| | | |
|---|---|---|
| 747,177 | 3/33 | France. |
| 1,134,770 | 12/56 | France. |

JACOB L. NACKENOFF, *Primary Examiner.*